United States Patent [19]

Ray

[11] Patent Number: 5,336,130

[45] Date of Patent: Aug. 9, 1994

[54] ADJUSTABLE EXHAUSTER ARM ASSEMBLY

[75] Inventor: Shaun Ray, Wichita, Kans.

[73] Assignee: Metal-Fab, Inc., Wichita, Kans.

[21] Appl. No.: 26,521

[22] Filed: Mar. 4, 1993

[51] Int. Cl.⁵ .............................................. B08B 15/04
[52] U.S. Cl. ...................................................... 454/65
[58] Field of Search ..................................... 454/63, 65

[56] References Cited

U.S. PATENT DOCUMENTS

| | | |
|---|---|---|
| 3,818,817 | 6/1974 | Nederman . |
| 4,158,462 | 6/1979 | Coral ..................... 285/168 |
| 4,163,650 | 8/1979 | Watson et al. ........................ 454/63 |
| 4,379,548 | 4/1983 | Bushoven ......................... 454/65 X |
| 4,860,644 | 8/1989 | Kohl et al. . |
| 5,036,754 | 8/1991 | Simms et al. ........................... 454/65 |
| 5,159,737 | 11/1992 | Kimura et al. ...................... 454/63 X |
| 5,211,602 | 5/1993 | Holmgren ............................. 454/63 |

FOREIGN PATENT DOCUMENTS

| | | |
|---|---|---|
| 3004392 | 8/1981 | Fed. Rep. of Germany ........ 454/65 |
| 386211 | 6/1973 | U.S.S.R. ............................... 454/65 |
| 1530275 | 12/1989 | U.S.S.R. ............................... 454/65 |
| 2046858 | 11/1979 | United Kingdom .................. 454/65 |

OTHER PUBLICATIONS

Kemper "Always a Clean Solution", one page.
Nederman "Pivoting Arm", four pages.

*Primary Examiner*—Harold Joyce
*Attorney, Agent, or Firm*—Bill D. McCarthy

[57] ABSTRACT

An exhauster arm assembly for capturing gaseous fumes which comprises a base member connected to a support structure, a hood member, a plurality of rigid tubular sections disposed between the base member and the hood member, and a plurality of flexible tubular sections interconnecting the base member, the rigid tubular sections and the hood member such that fluid communication is provided between the base members and the hood member. A plurality of joint assemblies pivotally support the hood member and the rigid tubular sections. An actuator, controlled from a switch assembly located on the hood member, is mounted on the base member and the adjacent rigid tubular section to precisely position the hood member.

44 Claims, 6 Drawing Sheets

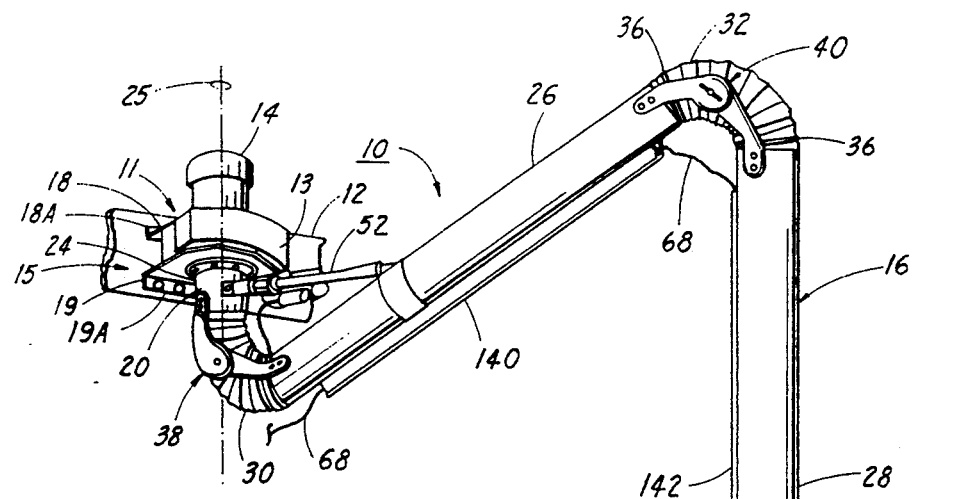
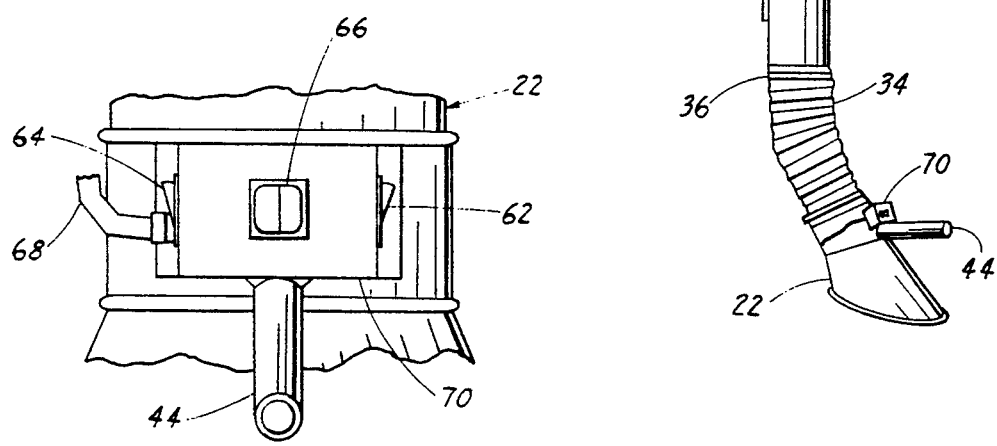
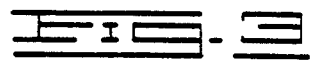
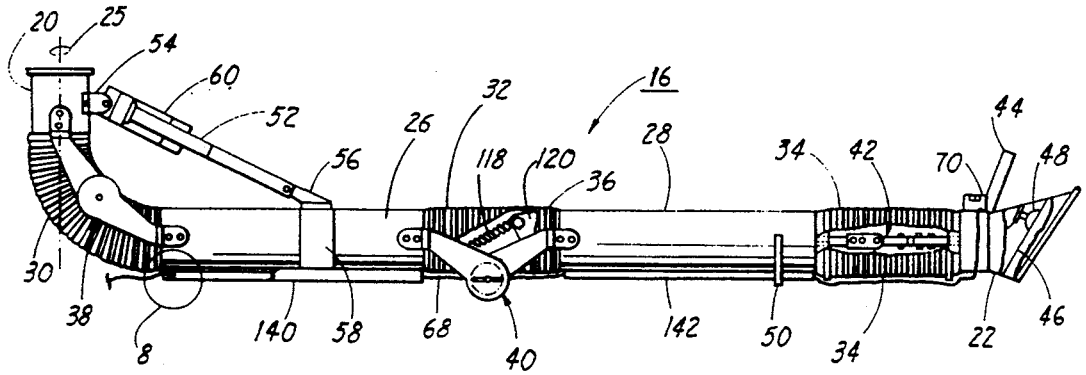

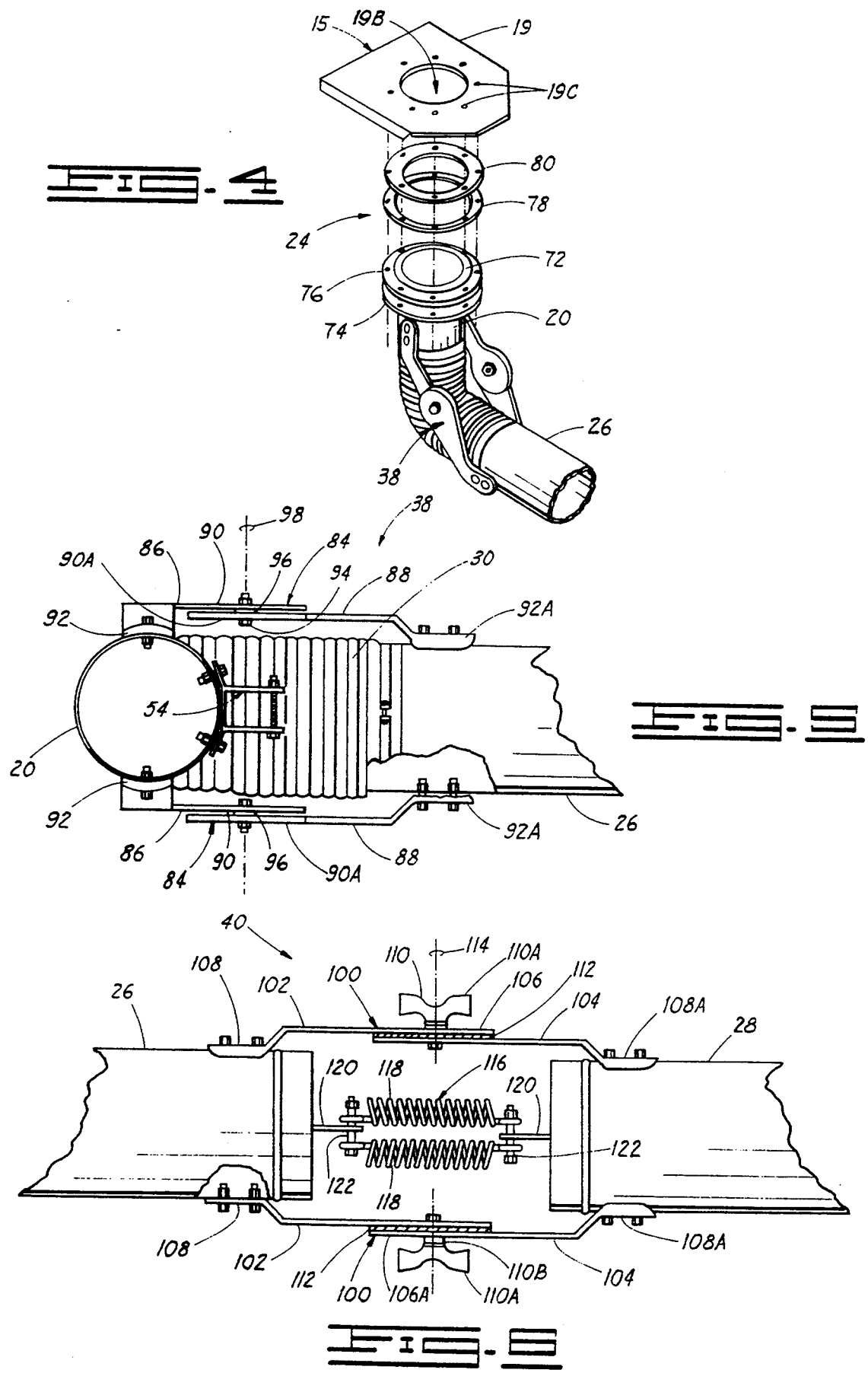

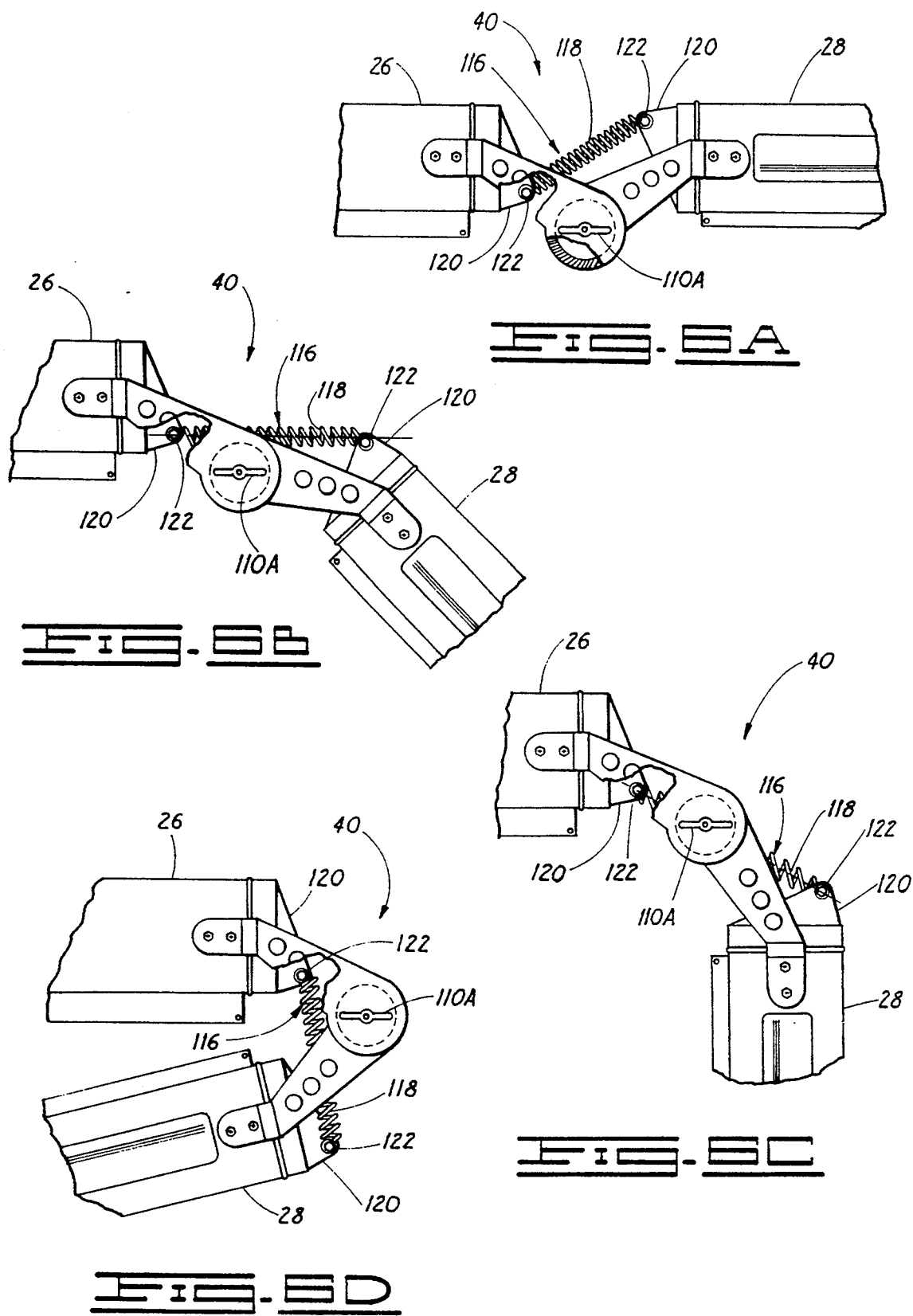

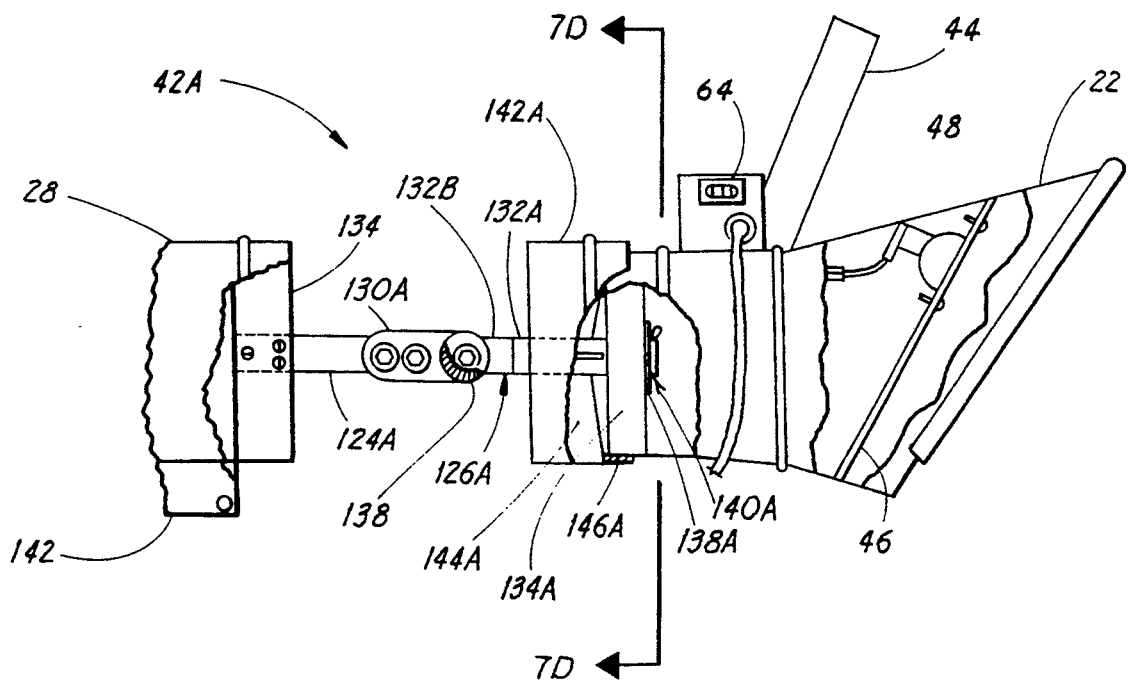
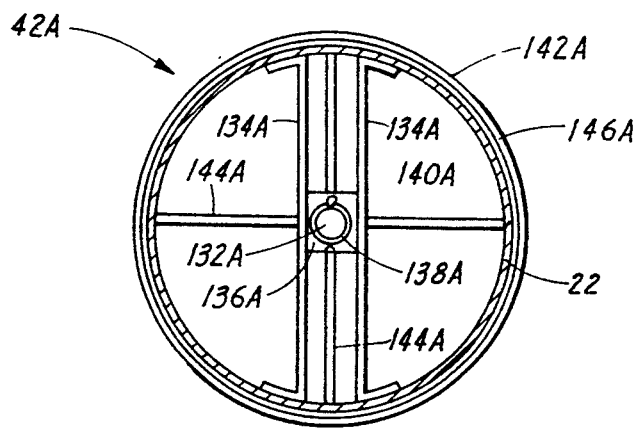

ADJUSTABLE EXHAUSTER ARM ASSEMBLY

BACKGROUND OF THE INVENTION

1. Field of the Invention

The present invention relates to an apparatus for exhausting gaseous fumes, and more particularly but not by limitation, to an improved adjustable exhauster arm assembly for capturing fumes at their source.

2. Brief Discussion of Prior Art

In the past, it was common to use large exhaust hoods or fans to remove industrial pollutants, such as welding smoke, grinding dust and other gaseous fumes. In recent years, however, it has become more common to remove these pollutants at their source with localized exhaust fans or blowers provided with maneuverable capture exhauster arms.

Several prior art exhauster arms have been proposed for capturing fumes at their source. One such arm is disclosed in U.S. Pat. No. 4,860,644, issued to Kohl et al. The Kohl et al. patent discloses an adjustable exhauster arm having internally disposed joint assemblies which are positioned adjacent the inside curvature of a flexible hose which surrounds the attaching assemblies. This internal structure makes adjusting the tension of the attaching assemblies inconvenient since the flexible hose must first be removed.

U.S. Pat. No. 4,158,462, issued to Coral, discloses an adjustable exhauster arm having externally disposed articulating structure. However, this structure is rather bulky and unsightly, and while the articulating structure of Coral is more accessible for making adjustments and repairs than the articulating structure disclosed in Kohl et al., it is inconvenient to do so. The Coral patent further discloses an elastic balancing assembly for supporting the exhauster arm. This balancing assembly does not provide solid support for the arm or allow for accurate and precise positioning of the arm.

U.S. Pat. No. 3,818,817, issued to Nederman, discloses an adjustable exhauster arm wherein an internal support structure extends the length of the arm and supports a flexible tubing extending between a fan and a suction hood.

While many of the prior art exhauster arms, including those taught by the above mentioned patents, have achieved varying degrees of success, such devices are relatively difficult to manipulate and inefficient to operate. The present invention provides for easy adjustment, less maintenance and precise positioning.

SUMMARY OF THE INVENTION

The present invention is directed to an improved exhauster arm assembly for conducting gaseous fumes from a work area and which is operably connected to a vacuum source and mounted to a supporting surface. Broadly, the exhauster arm assembly of the present invention comprises an arm assembly and a support assembly. The arm assembly includes a base collar connected to the support assembly, a hood member, a plurality of rigid tubular members interposed between the base collar and the hood member, and a plurality of flexible tubular members fastened to the base collar, these members arranged to provide fluid communication between the base collar and the hood member. The arm assembly further includes a plurality of joint assemblies which pivotally support the hood member and the rigid tubular members so that the arm assembly can be maneuvered to a desired position.

To further facilitate the positioning of the arm assembly, an actuator is mounted between the base collar and the adjacent rigid tubular member. Employment of the actuator allows the adjacent rigid tubular section to be selectively moved relative to the base collar thereby allowing for more precise positioning of the hood member. A switching assembly is provided on the hood member to operate the vacuum source, the actuator, and as well, a lamp mounted in the hood member. A boom arm assembly is used to extend the effective radial reach of the arm assembly and to permit a second arm assembly to be operated off of the vacuum source.

An object of the present invention is to provide an improved exhauster arm for conducting fumes from a work area and which is accurately positionable.

Another object of the present invention, while achieving the above stated object, is to provide an exhauster arm that is easy to maneuver and efficient to operate.

Still another object of the present invention, while achieving the above stated objects, is to provide an exhauster arm that is durable in construction, economical to manufacture and which overcomes the disadvantages of the prior art.

Other objects, advantages and features of the present invention will be apparent from the following detailed description when read in conjunction with the drawings and the appended claims.

BRIEF DESCRIPTION OF THE DRAWINGS

FIG. 1 is a perspective view of the exhauster arm of the present invention shown operably connected to a vacuum source and supported by a support structure.

FIG. 2 is a partially cutaway, side view of the exhauster arm of FIG. 1.

FIG. 3 is a fragmental, top plan view of the switching assembly mounted on the hood member.

FIG. 4 is an exploded, perspective view of the mounting assembly and the base collar.

FIG. 5 is a fragmental, partially cutaway, top plan view of the first joint assembly.

FIG. 6 is a fragmental, partially cutaway, top plan view of the second joint assembly with the flexible tube removed. FIGS. 6A–6D are side views of the second joint assembly with the flexible tube removed, showing the third rigid tube at various angles of inclination relative to the second rigid tube.

FIG. 7C is a fragmental, partially cutaway, side elevational view of the hood member and an alternative third joint assembly with the flexible tube removed. FIG. 7D is a cross section taken at 7D—7D in FIG. 7C.

DETAILED DESCRIPTION

Figure 7A:
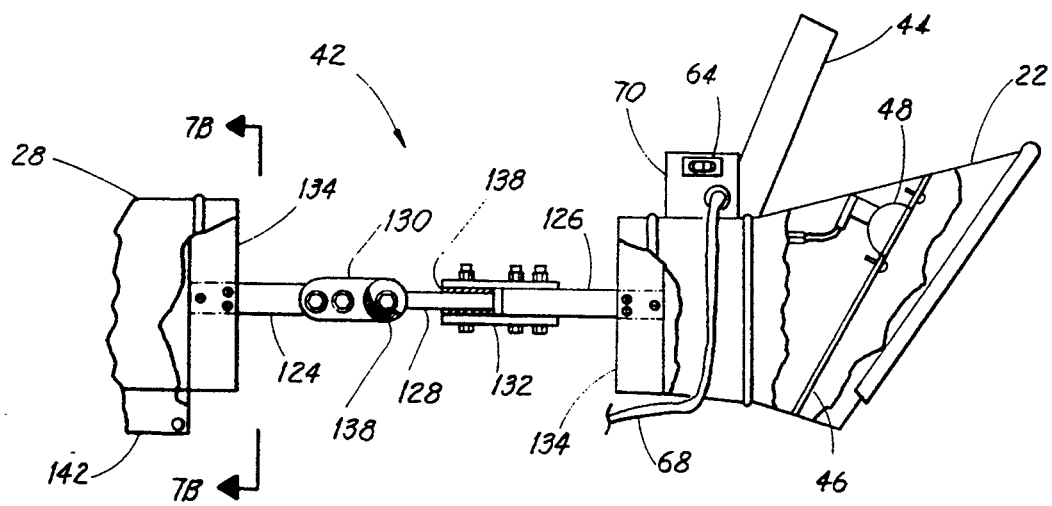
FIG. 7A is a fragmental, partially cutaway, side elevational view of the hood member and the third joint assembly with the tube removed.

Referring now to the drawings, and more particularly to FIG. 1, an exhauster arm assembly 10 constructed in accordance with the present invention is shown operably connected to a vacuum source 11 and mounted to a supporting surface 12. The vacuum source 11 is shown herein as a blower 13 powered by a motor 14. It will be understood that the supporting surface 12 can be a wall or ceiling or some other fixed or portable structure.

The exhauster arm assembly 10, as shown in FIG. 1, includes a support assembly 15 and an arm assembly 16. The support assembly 15 includes an upper bracket or motor mount plate 18 and a lower bracket 19, each bracket 18 and 19 preferably being constructed of steel. The upper and lower brackets 18, 19 are each provided with an angle portion 18A and 19A, respectively, for mounting the upper and lower brackets 18, 19 to the supporting surface 12. The upper and lower brackets 18, 19 are mounted to the supporting surface 12 in a suitable manner, such as with a plurality of nuts and bolts.

The blower 13 is connected to and supported by the lower bracket 19, and the motor 14 is connected to and supported by the upper bracket 18. The lower bracket 19 is provided with a flow opening 19B (shown only in FIG. 4) centrally disposed therethrough to provide fluid communication between the arm assembly 16 and the blower 13. In addition, the lower bracket 19 is provided with a plurality of bolt holes 19C (also shown only in FIG. 4) that permit the arm assembly 16 to be secured to the lower bracket 19 as described hereinbelow in reference to FIG. 4.

As shown in FIGS. 1 and 2, the arm assembly 16 includes a plurality of rigid tubular sections connected to a plurality of flexible tubular sections in an alternating relationship so as to form a fluid conduit. More specifically, the arm assembly 16 has a first rigid tube or base collar 20 at one end and a hood member 22 at a second end. The base collar 20 is connected to the lower bracket 19 by a mounting assembly 24 (shown only in FIG. 1) which permits the arm assembly 16 to be rotated about an axis 25 as described hereinbelow.

The base collar 20 is interconnected with the hood member 22 by second and third rigid tubes 26, 28 alternated with first, second and third flexible tubes 30, 32, 34. The flexible tubes 30, 32, 34 are secured over the ends of the base collar 20, the second and third rigid tubes 26, 28 and the hood member 22, respectively, with clamp bands 36 in a conventional manner. The hood member 22 and the second and third rigid tubes 26, 28 are preferably constructed from galvanized steel and the base collar 20 from carbon reinforced steel, but each can be constructed from any suitable material.

Varying Joint assemblies are used to pivotally support the second and third rigid tubes 26, 28 and the hood member 22. In particular, a first joint assembly 38 pivotally supports the second rigid tube 26 relative to the first rigid tube 20; a second joint assembly 40 pivotally supports the third rigid tube 28 relative to the second rigid tube 26; and a third joint assembly 42 pivotally supports the hood member 22 relative to the third rigid tube 28. The first and second Joint assemblies 38, 40 provide single axes of pivotation between the rigid tubes 20, 26 and 28; the third joint assembly 42 provides universal joint movement for the hood member 22 relative to the third rigid tube 28. The third or universal joint assembly 42, as well as the first and second joint assemblies 38, 40, will be described in further detail hereinbelow.

The hood member 22 is positioned on the free end of the arm assembly 16 and, as best shown in FIG. 6A (which will be discussed below), is characterized as being substantially funnel shaped. A handle 44 is secured to the hood member 22 to permit one to manually maneuver the arm assembly 16, and a grill 46 is secured across the opening of the hood member 22 to prevent large objects from being drawn therein. A lamp 48 is attached to the grill 46 to illuminate the work area. To control the suction of the hood member 22, a damper plate (not shown) having a handle 50 is positioned in the third rigid tube 28.

Exhauster arms vary in size and weight, and a problem encountered when using larger exhauster arms is that they become awkward to manipulate, particularly at the Joint assembly nearest the vacuum source (in FIG. 1, the first Joint assembly 38). Thus, precise positioning of the exhauster arm becomes rather difficult and frustrating. To overcome this problem, as well as to provide a solid support, the arm assembly 16 is provided with a linear actuator 52. The actuator 52 is a conventional screw type actuator fixed between the first rigid tube 20 and the second rigid tube 26 to control the angle of inclination between the first rigid tube 20 and the second rigid tube 26.

The actuator 52 is secured to the first rigid tube 20 by a pin anchor assembly 54 (best shown in FIG. 2) and to the second rigid tube 26 by an anchor plate 56 attached to an adjustable support clamp 58. The position of the support clamp 58 on the second rigid tube 26 can be varied so as to change the ranges between which the second rigid tube 26 can be moved relative to the first rigid tube 20. That is, the closer the support clamp 58 is positioned to the first joint assembly 38, the larger the angle of inclination established between the base collar 20 and the second rigid tube 26, and the closer the support clamp 58 is positioned to the second joint assembly 40, the smaller the angle of inclination will be.

It should be noted, however, that to prevent damage to the actuator 52 or the lower bracket 19, the support clamp 58 should not be positioned on the second rigid tube 26 such that the actuator 52 can come into contact with the lower bracket 19 when the actuator 52 is fully retracted. The range of motion required of the second rigid tube 26 will depend on the environment in which the exhauster arm assembly 10 is used.

The actuator 52 is powered by a motor 60 which is electrically energized by a power source (not shown) in a conventional manner. The power source further energizes the other electrical components described above.

As shown in FIG. 3, the electrical components of the exhauster arm assembly 10 (i.e., the motor 14, the lamp 48 and the actuator 52) are electrically connected to respective switches 62, 64 and 66 located on the hood member 22 via an electric cable 68. The switches 62, 64, 66 are mounted in a switch box 70 which is preferably attached to the hood member 22 adjacent to the handle 44. This arrangement of the handle 44 and the switches 62, 64 and 66 is particularly advantageous because it provides for easy and efficient operation of the exhauster arm assembly 10.

Referring now to FIG. 4, the base collar 20 and the mounting assembly 24 are shown in an exploded view. The first rigid tube or base collar 20 includes a flanged end portion 72 which cooperates with the mounting assembly 24 to permit the arm assembly 16 to be rotated about the axis 25 when the base collar 20 is secured to the lower bracket 19. The mounting assembly 24 includes a mounting ring 74, a first gasket ring 76 with a slit, a shim ring 78 and a second gasket ring 80; each having a hole pattern which matches that of the lower bracket 19. The mounting ring 74 and the shim ring 78 can be constructed of any suitable material, such as metal, but the first gasket ring 76 and the second gasket ring 80 are preferably constructed of a material having a low coefficient of friction, such as nylon.

The base collar 20 is secured to the lower bracket 19 with the mounting assembly 24 by sliding the first gasket ring 76 over the base collar 20 prior to connecting the flexible tube 30 and the first joint assembly 38 thereto. The mounting ring 74 is then inserted over the base collar 20 so that the first gasket ring 76 is positioned between the mounting ring 74 and the flanged end portion 72 of the base collar 20. The shim ring 78 is then positioned about the flanged end portion 72 of the base collar 20. Finally, the second gasket ring 80 is positioned over the flanged end portion 72 and the shim ring 78. The mounting assembly 24 is secured to the lower bracket 19 with a plurality of nuts and bolts. The shim ring 78 is dimensioned such that a void between the first gasket ring 76 and the second gasket ring 80 is formed in which the flanged end portion 72 of the base collar 20 is able to rotate when the base collar 20 is secured to the lower bracket 19 with the mounting assembly 24.

In FIG. 5, a top plan view of the first joint assembly 38 which is used to connect the base collar 20 to the second rigid tube 26 is shown. The first joint assembly 38 includes a pair of brackets 84; each bracket 84 includes two support arms 86, 88. Each support arm 86 has a radial end portion 90 and a mounting end portion 92. Each support arm 88 has a radial end portion 90A and a mounting end portion 92A. The support arms 86, 88 are configured such that the radial end portions 90, 90A, are axially offset from the mounting end portions 92, 92A so that the brackets 84 and the flexible tube 30 do not interfere with each other when the exhauster arm assembly 10 is pivoted at the first joint assembly 38. The support arms 86, 88 are pivotally coupled together at the radial end portions 90, 90A with a nut and bolt combination 94. To facilitate pivotation, a low friction pad, such as nylon disc 96, is interposed between each pair of support arms 86, 88. The brackets 84 are mounted in a parallel relationship on the base collar 20 and the second rigid tube 26 at the mounting end portion 92A such that a single axis of pivotation is formed about an axis 98. The brackets 84 are mounted on the exterior of the base collar 20 and the second rigid tube 26 in a suitable manner, such as with nuts and bolts as is shown herein.

In addition to the radial end portions 90, 90A of the support arms 86, 88 being axially offset from the mounting end portions 92, 92A the radial end portions 90, 90A are also angularly offset, as illustrated in FIGS. 1 and 2. Such a configuration causes the joint assembly 38 to substantially follow the contour of the flexible tube 30 when the base collar 20 and the second rigid tubes 26 are in an inclined position relative to one another, thus producing a clean line along the flexible tube 30 and overcoming the problems mentioned above associated with other externally mounted joint assemblies.

FIG. 6 is a top plan view of the second joint assembly 40 with the second flexible tube 32 removed. In like fashion to the first joint assembly 38, the second joint assembly 40 includes a pair of brackets 100 with each bracket 100 including two pivotally coupled support arms 102, 104. Each of the support arms 102 has a radial end portion 106 and a mounting end portion 108; and each of the support arms 104 has a radial end portion 106A and a mounting end portion 108A. Like the support arms 86, 88 of the first joint assembly 38, the support arms 102, 104 are geometrically configured such that the radial end portions 106, 106A are axially and angularly offset from the mounting end portions 108, 108A. Each pair of the support arms 102, 104 are pivotally coupled together at the radial end portions 106, 106A by a nut and bolt combination 110. To aid in maintaining the second joint assembly 40 at a desired angle of inclination, a friction pad 112 is interposed between each pair of the support arms 102, 104.

The brackets 100 are mounted in a parallel relationship on the exterior of the second and third rigid tubes 26, 28 at the mounting end portions 108, 108A such that a single axis of pivotation is formed about an axis 114 which is preferably parallel to axis 98 (shown in FIG. 5). The brackets 100 are mounted to the second and third rigid tubes 26, 28 in a suitable manner, such as with nuts and bolts as shown herein.

As above stated, the support arms 102, 104 are coupled together by the nut and bolt combination 110. The nut and bolt combination 110 includes a wing nut 110A and a thrust bearing 110B which cooperate with a bearing assembly 116 (described below) to provide the second Joint assembly 40 with the advantage of being finger adjustable; that is, the second joint assembly 40 can be tightened or loosened by the application of force no greater than that exerted by the finger strength of the ordinary operator.

The biasing assembly 116 includes a pair of springs 118 that interconnect the second and third rigid tubes 26, 28. The springs 118 are extended between a pair of webs 120 which are fixed in the ends of the second and third rigid tubes 26 and 28, respectively. More specifically, the springs 118 are attached to a pair of pins 122 which are disposed through the webs 120.

As shown in FIGS. 6A-6D the pins 122 are disposed in the webs 120 so that the springs 118 will extend diagonally from the second rigid tube 26 to the third rigid tube 28. That is, the springs 118 are diagonally oriented between the second and third rigid tubes 26, 28 such that the springs 118 have unrestricted pivotation with the second and third rigid tubes 26, 28 as the second and third rigid tubes 26, 28 are pivoted relative to one another (such as illustrated in FIGS. 6A-6D) and such that the maximum extension of the springs 118 occurs as the longitudinal axis of the springs 118 intersects axis 114 of the second joint assembly 40 (FIG. 6C). This arrangement of the springs 118 ensures that the springs 118 will carry a portion of the load exerted on the second joint assembly 40 by the weight of the arm assembly 16 when the third rigid tube 28 is in alignment with, or inclined relative to, the second rigid tube 26. This in turn reduces the amount of tightening torque that must be applied to the nut and bolt combination 110 to maintain the third rigid tube 28 in a desired position relative to the second rigid tube 26.

This arrangement of the springs 118 also effects spring assisted movement to the second Joint 40. That is, because the springs 118 are at their maximum extension when the third rigid tube 28 is extended substantially downward, as shown in FIG. 6C, the springs 118 will assist an operator in moving the third rigid tube 28 from the position of FIG. 6C to various other positions, such as those depicted in FIGS. 6A, 6B and 6D. In the reverse, the weight of the third rigid tube 28 will counteract the tension of the springs 118 and allow an operator to easily move the third rigid tube 28 from the positions of FIGS. 6A, 6B and 6D, toward the position of FIG. 6C.

Figure 7B:
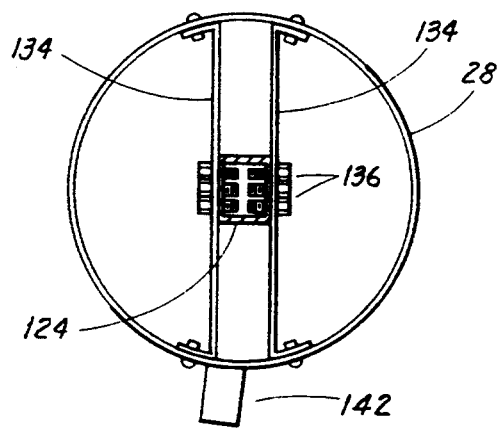
FIG. 7B is a cross section taken at 7B—7B in FIG. 7A.

Referring to FIG. 7A and 7B, the third joint assembly 42 is more clearly illustrated, having the third flexible tube 34 removed. As previously stated, the third joint assembly 42 connects the hood member 22 to the third rigid tube 28 in a manner in which universal joint movement is provided. The third joint assembly 42 includes a first connecting rod 124, a second connecting rod 126, an intermediate connecting rod 128, and two pairs of linking brackets 130 and 132. The first and second connecting rods 124, 126 and the intermediate connecting rod 128 are preferably square tubular members constructed of aluminum, while the linking brackets 130 and 132 are preferably oblong-shaped steel plate members.

The first connecting rod 124 is rigidly connected to the interior of the third rigid tube 28 by attaching one end of the first connecting rod 124 between a pair of parallel webs 134 which are fastened to the inner wall of the third rigid tube 28 as best shown in FIG. 7B. The first connecting rod 124 is rigidly attached to the webs 134 in a suitable fashion, such as with screws 136. The second connecting rod 126 is rigidly attached to the interior of the hood member 22 in an identical fashion as that described for attaching the first connecting rod 124 to the third rigid tube 28.

At the other end of the first connecting rod 124, the linking brackets 130 are rigidly attached on either side of the first connecting rod 124 such that the linking brackets 130 are parallel to the webs 134 which are secured in the third rigid tube 28. In a like manner, the linking brackets 132 are rigidly attached to the second connecting rod 126; however, the linking brackets 132 are attached to the second connecting rod 126 such that the linking brackets 132 are in a perpendicular relationship to the linking brackets 130.

To provide universal joint movement, the intermediate connecting rod 128 is pivotally connected between the linking brackets 130 at one end and between the linking brackets 132 at the other end. Friction pads 138 are interposed between the linking brackets 130 and 132 and the intermediate connecting rod 128 to maintain the hood member 22 in a selected position.

FIGS. 7C and 7D illustrate an alternative third joint assembly 42A which connects the hood member 22 to the third rigid tube 28 in a manner in which swivel joint movement is provided. The third joint assembly 42A includes a first connecting rod 124A, a second connecting rod 126A and a pair of linking brackets 130A. The first connecting rod 124A is identical in construction to the first connecting rod 124 and is also rigidly connected to the third rigid tube 28 at one end and rigidly connected to the linking brackets 130A in the same manner as described above for the third joint assembly 42.

The second connecting rod 126A includes a round tubular member 132A and a square tubular member 132B attached to one end of the round tubular member 126A as substantially shown. The square tubular member 132B of the second connecting rod 126A is pivotally connected to the linking brackets 130A so as to permit pivotation of the second connecting rod 126A about a single axis. In a like manner as described above for the third joint assembly 42, friction pads 138 are interposed between the linking brackets 130A and the square tubular member 132B.

The other end of the round tubular member 132A is rotatably journaled to the hood member 22 so as to permit the hood member 22 to be swiveled. More specifically, the hood member 22 is provided with a pair of paralleled webs 134A which are fastened to the inner wall of the hood member 22 and a bearing 136A secured between the webs 134A to rotatably receive the end of the round tubular member 132A, as best shown in FIG. 7D. The round tubular member 132A is secured within the bearing 136A with a washer 138A and a cotter pin 140A.

To enable the hood member 22 to rotate about the second connecting rod 126A without the third flexible tube 34 twisting, the third joint assembly 42A further includes an intermediate tube portion 142A on which the third flexible tube 34 is secured. The intermediate tube portion 142 A is supported about the second connecting rod 126A with a plurality of fins 144A extending radially from the round tubular member 132A, and is dimensioned to slidably fit over the end of the hood member 22, as shown. A seal ring 146A constructed of a material having a low coefficient of friction, such as nylon, is disposed between the hood member 22 and the intermediate tube portion 142A to effect a substantially air tight seal therebetween, while allowing an operator to freely rotate the hood member 22 about the second connecting rod 126A.

Because the switches 62, 64, 66 are located on the hood member 22, the electric cable 68 is run from the hood member 22 to the power source (not shown) along the exterior of the exhauster arm assembly 10, as illustrated in FIGS. 1 and 2. If the electric cable 68 is not protected, it can be cut, nicked or damaged in some manner. To protect the electric cable 68 from such abuse, the exhauster arm assembly 10 is provided with first and second guard members 140 and 142 which are secured along the exterior of the second and third rigid tubes 26 28, respectively, to house the electric cable 68 (FIGS. 1 and 2). The guard members 140 and 142 are channel-shaped members preferably constructed of galvanized steel.

Figure 8:
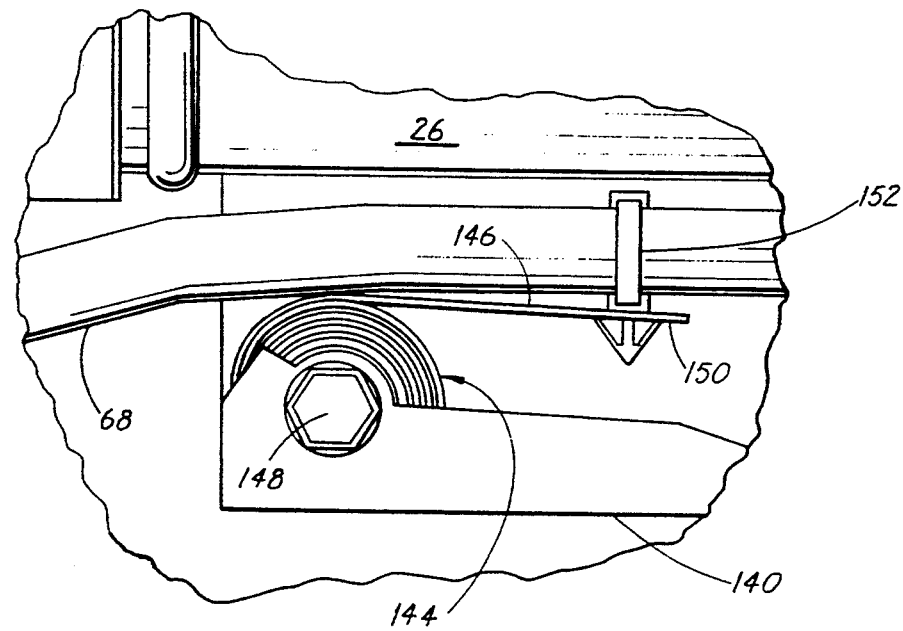
FIG. 8 is an enlarged view of the encircled area of FIG. 2 illustrating the spring mechanism attached to the electric cable.

As illustrated in FIG. 8, the electric cable 68 is attached to a spring mechanism 144 which is mounted in one end of the first guard member 140 to allow the electric cable 68 to retract and expand in response to movement of the exhauster arm assembly 10. The spring mechanism 144 has a coiled spring 146 which has its inner end secured to a stationary arbor 148. The electric cable 68 is attached to outer end 150 of the spring 146 by a wire tie 152. The spring 146 expands and retracts in response to movement of the electric cable 68 as the exhauster arm assembly 10 is caused to extend or retract, thereby maintaining the electric cable 68 in a taut condition as the hood member 22 is moved to various positions.

To facilitate movement of the electric cable 68 through the first and second guard members 140, 142, a spacer (not shown) made of a low friction material, such as nylon, is fastened on the interior of the first and second guard members 140, 142 preferably on the ends thereof, which allows the electric cable 68 to slide easily through the guard members 140, 142. With use of the spring mechanism 144, the slack in the electric cable 68

FIGS. 9-10

It may be desirable to increase the effective radial reach of the arm assembly 16, as well as to operate a second arm assembly 16A off of the vacuum source 11. Such can be readily accomplished by incorporating a pair of support brackets 154 and 155 and a boom arm assembly 156 into the support assembly 15. The second arm assembly 16A is identical in construction to the arm assembly 16, thus only support brackets 154, 155 and the boom arm assembly 156 will be discussed in detail with reference to FIGS. 9 and 10.

The support brackets 154 and 155 are different in construction to the upper and lower brackets 18 and 19 described above. Brackets 18 and 19 are configured to support the vacuum source 11 and the arm assembly 16; on the other hand, support brackets 154 and 155 are configured to support the boom arm assembly 156 and the arm assemblies 16 and 16A. When employing the support brackets 154 and 155 the vacuum source 11 can be supported above the support bracket 154 with upper and lower brackets 18 and 19 in the manner described above and operably connected to the boom arm assembly 156 via a hose or some other suitable conduit member.

Figure 9:
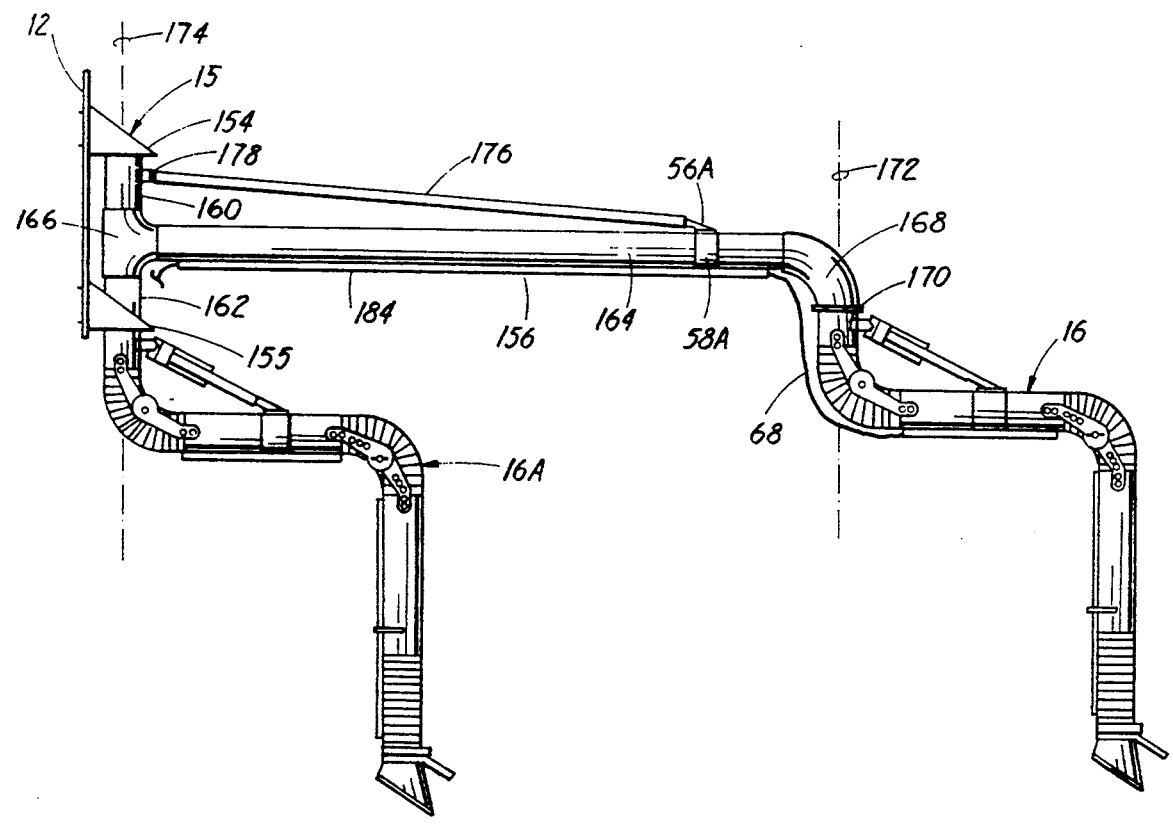
FIG. 9 is an elevational view of a pair of arm assemblies constructed in accordance with the present invention connected to a boom arm assembly.
Figure 10:
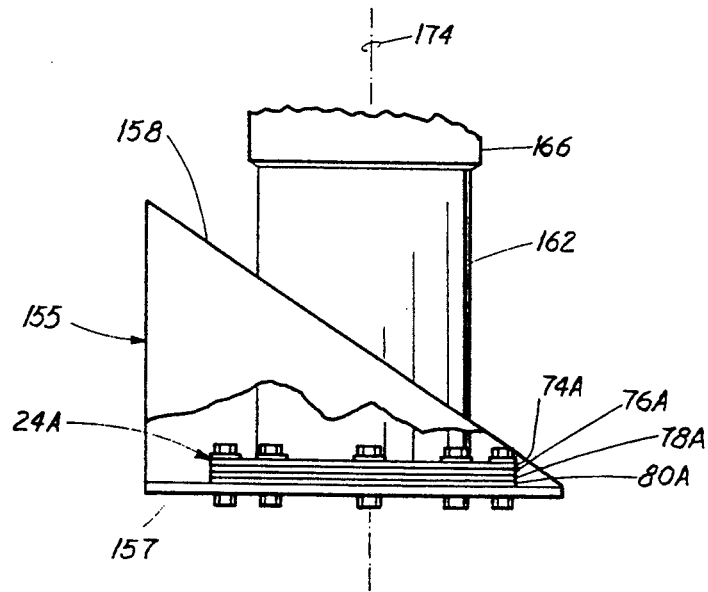
FIG. 10 is a fragmental, partially cutaway, side elevational view of a second collar of the boom arm assembly shown connected to a support bracket.

The support brackets 154 and 155 each have a base plate 157 with a flow opening (not shown) and a pair of triangular gussets 158 oppositely disposed on the sides thereof (only one of each shown in FIG. 9). Similar to the upper and lower brackets 18 and 19, the support brackets 154 and 155 are provided with angle portions (not shown) for mounting the support brackets 154 and 155 to the supporting surface 12. The support brackets 154 and 155 are mounted to the supporting surface 12 in a spatial relationship so that the boom arm assembly 156 can be rotatably connected to each support bracket 154 and 155 in a manner described hereinbelow.

The boom arm assembly 156 includes a first collar 160 and a second collar 162 connected to a boom tube 164. The first and second collars 160, 162 are secured to one end of the boom tube 164 via a tee 166. An elbow 168 is connected to the other end of the boom tube 164, as illustrated in FIG. 9. The elbow 168 is provided with a flanged end 170 which allows the arm assembly 16 to be rotatably secured thereto in the manner described above for securing the arm assembly 16 to the lower bracket 19 such that the arm assembly 16 is rotatable about an axis 172. In a like manner, the second arm assembly 16A is rotatably connected to the support bracket 155. In the instance that the boom arm assembly 156 is employed without attachment of the second arm assembly 16A, a cover plate (not shown) is secured over the flow opening of the support bracket 155.

To rotatably connect the first and second collars 160, 162 to the support brackets 154 and 155, respectively, the first and second collars 160, 162 are each provided with a flanged end portion (not shown) which are similar in construction to the flanged end portion 72 of the base collar 20 and which in a like manner cooperate with a mounting assembly 24A to permit the boom arm assembly 156 to be rotated about an axis 174 when the boom arm assembly 156 is secured to the support brackets 154 and 156. The first and second collars 160, 162 of the boom arm assembly 156 are connected to the support brackets 154 and 156 respectively, in an identical manner, thus only the connection of the second collar 162 to the support bracket 155 will be described below in reference to FIG. 10.

The mounting assembly 24A is similar to that described above for mounting assembly 24 in that mounting assembly 24A includes a mounting ring 74A, a first gasket ring 76A, a shim ring 78A and a second gasket ring 80A; each having a hole pattern which matches that of the support bracket 155. To enable the mounting assembly 24A to be assembled, the mounting ring 74A and the first gasket ring 76A are split.

The second collar 162 is rotatably attached to the support bracket 155 by positioning the second gasket ring 80A between the flanged end portion (not shown) of the second collar 162 and the base plate 157 of the support bracket 155. The shim ring 78A is then positioned about the flanged end portion. The first gasket ring 76A is positioned over the shim ring 78A and the flanged end portion of the second collar 162 and secured in position with the mounting ring 74A and a plurality of nuts and bolts. The shim ring 78A is dimensioned such that a void between the first and second gasket rings 76A, 78A is formed in which the flanged end portion (not shown) is able to rotate when the support collar 162 is secured to the support bracket 155 with the mounting assembly 24A.

The boom tube 164 is horizontally supported with a support rod 176 which is fixed at one end to the first support collar 160 and at another end to the boom tube 164. The support rod 176 is secured to the first support collar 160 with a pin anchor assembly 178 and to the boom tube 164 with an anchor plate 56A attached to an adjustable support clamp 58A in a like manner as described above for securing the actuator 52 to the arm assembly 16. The boom tube 164 is further provided with a guard member 184, constructed similarly to the first and second guard members 140, 142 described above. The guard member 184 is secured along the exterior of the boom tube 164 and houses the electric cable 68.

OPERATION

In the use of the exhauster arm assembly 10, an operator is provided with the capability to quickly and accurately position the hood member 22 near the source of gaseous pollutants so that such pollutants can be effectively exhausted from the work area. The general direction of the hood member 22 and the second and third rigid tubes 26, 28 are obtained by rotating the arm assembly 16 at the mounting assembly 24. The hood member 22 is then positioned by adjusting the inclination of the first, second and third joint assemblies 38, 40 and 42.

The first joint assembly 38 is adjusted by operating the actuator 52 with the switch 66 supported on the hood member 22. The second joint assembly 40 is adjusted by use of the handle 44 attached to the hood member 22, and is easily done so as a result of the biasing assembly 116 interconnecting the second and third rigid tubes 26, 28. The tension of the second joint assembly 40 is increased or decreased by simply turning the wing nuts 110A with one's fingers. Final adjustments to the position of the hood member 22 are made at the third or universal joint assembly 42.

With the hood member 22 positioned, the vacuum source 11 is activated with the switch 62 located on the hood member 22. Similarly, the lamp 48 positioned in the hood member 22 to illuminate the work area is activated with the switch 64.

Employment of the boom arm assembly 154 provides greater versatility to an operator of the exhauster arm assembly 10 by extending the work range thereof and by further enabling a second arm assembly to be simultaneously operated. When the arm assembly 16 is attached to the boom arm assembly 154, the exhauster arm assembly 10 is positioned generally by rotating the arm assembly 16 and the boom arm assembly 154 with the handle 44. The arm assembly 16 is then further positioned as previously described. When a second arm assembly is attached to the boom arm assembly 156, it is positioned as described above independent of the position of the boom arm assembly 156 and the arm assembly 16.

From the above description it is clear that the present invention is well adapted to carry out the objects and to attain the ends and advantages mentioned herein as well as those inherent in the invention. While presently preferred embodiments of the invention have been described for purposes of this disclosure, it will be understood that numerous changes may be made which will readily suggest themselves to those skilled in the art and which are accomplished within the spirit of the invention disclosed and as defined in the appended claims.

What is claimed is:

1. An adjustable exhauster arm assembly for conducting gaseous fumes from a work area, the exhauster arm assembly operably connected to a vacuum source and mounted to a supporting surface, the exhauster arm assembly comprising:
    a first arm assembly comprising:
        a hood member;
        a base collar;
        a plurality of rigid tubular members disposed between the base collar and the hood member;
        a plurality of flexible tubular members interconnecting the base collar, the rigid tubular members and the hood member in an alternating relationship such that fluid communication is provided between the base collar and the hood member;
        joint means for pivotally supporting the hood member and the rigid tubular members in a selected position; and
        actuator means for selectively moving and supporting the rigid tubular members;
    support means for rotatably interconnecting the base collar and the supporting surface;
    switching means, supported by the hood member and electrically connected to the actuator means, for selectively operating the actuator means, the switching means connected to the actuator means by an electric cable; and
    spring means connected to the electric cable for maintaining the electric cable in a substantially taut condition as the hood member and the tubular members are pivotally moved to varied positions.

2. The exhauster arm assembly of claim 1 further comprising channel means for receiving and shielding the electric cable as the electric cable slidably moves with movement of the hood member and the tubular members.

3. The exhauster arm assembly of claim 2 further comprising a lamp electrically connected to the switching means and supported by the hood member for illuminating the work area.

4. An adjustable exhauster arm assembly for conducting gaseous fumes from a work area, the exhauster arm assembly operably connected to a vacuum source mounted to a supporting surface, the exhauster arm assembly comprising:
    a first arm assembly comprising:
        a hood member;
        a base collar;
        a plurality of rigid tubular members disposed between the base collar and the hood member;
        a plurality of flexible tubular members interconnecting the base collar, the rigid tubular members and the hood member in an alternating relationship such that fluid communication is provided between the base collar and the hood member;
        joint means for pivotally supporting the hood member and the rigid tubular members in a selected position, the joint means comprising:
            a first joint comprising a pair of brackets to adjacent rigid tubular member in a parallel relationship, each bracket comprising:
                a pair of support arms; and
                connecting means for pivotally connecting the support arms;
            a second joint comprising a pair of brackets to adjacent rigid tubular members in a parallel relationship, each bracket comprising:
                a pair of support arms; and
                connecting means for pivotally connecting the support arms; and
            a third joint comprising:
                a first connecting rod having a first end rigidly connected to an adjacent rigid tubular member and having a second end rigidly connected to a first pair of linking brackets;
                a second connecting rod having a first end rigidly connected to the hood member and having a second end rigidly connected to a second pair of linking brackets such that the second pair of linking brackets are in a perpendicular relationship to the first pair of linking brackets; and
                a third connecting rod having a first end pivotally connected to the first pair of linking brackets and having a second end pivotally connected to the second pair of linking brackets so as to provide universal joint movement to the hood member; and
        actuator means for selectively moving and supporting the rigid tubular members; and
    support means for rotatably interconnecting the base collar and the supporting surface.

5. An adjustable exhauster arm assembly for conducting gaseous fumes from a work area, the exhauster arm assembly operably connected to a vacuum source mounted to a supporting surface, the exhauster arm assembly comprising:
    a first arm assembly comprising:
        a hood member;
        a base collar;
        a plurality of rigid tubular members disposed between the base collar and the hood member;
        a plurality of flexible tubular members interconnecting the base collar, the rigid tubular members and the hood member in an alternating relationship such that fluid communication is provided between the base collar and the hood member;

joint means for pivotally supporting the hood member and the rigid tubular members in a selected position, the joint means comprising:
  a first joint comprising a pair of brackets to adjacent rigid tubular members in a parallel relationship, each bracket comprising:
    a pair of support arms; and
    connecting means for pivotally connecting the support arms;
  a second joint comprising a pair of brackets to adjacent rigid tubular members in a parallel relationship, each bracket comprising:
    a pair of support arms; and
    connecting means for pivotally connecting the support arms; and
  a third joint comprising:
    a first connecting rod having a first end rigidly connected to an adjacent rigid tubular member and having a second end rigidly connected to a pair of linking brackets; and
    a second connecting rod having a first end rotatably journaled to the hood member and having a second end pivotally connected to the linking brackets of the first connecting rod; and
actuator means for selectively moving and supporting the rigid tubular members; and
support means for rotatably interconnecting the base collar and the supporting surface.

6. An adjustable exhauster arm assembly for conducting gaseous fumes from a work area, the exhauster arm assembly operably connected to a vacuum source and mounted to a supporting surface, the exhauster arm assembly comprising:
  a first arm assembly comprising:
    a hood member;
    a base collar;
    a plurality of rigid tubular members disposed between the base collar and the hood member;
    a plurality of flexible tubular members interconnecting the base collar, the rigid tubular members and the hood member in an alternating relationship such that fluid communication is provided between the base collar and the hood member;
    joint means for pivotally supporting the hood member and the rigid tubular members in a selected position; and
  actuator means for selectively moving and supporting the rigid tubular members; and
  support means for rotatably interconnecting the base collar and the supporting surface, the support means comprising:
    a first support bracket mounted to the supporting surface; and
    boom arm means for rotatably interconnecting the first arm assembly and the first support bracket and for radially extending the reach of the first arm assembly, the boom arm means comprising:
      a boom tube having a first end and a second end, the base collar of the first arm assembly rotatably connected to the second end of the boom tube;
      collar means connected to the first end of the boom tube for rotatably interconnecting the boom tube and the first support bracket; and
      a support rod having one end connected to the collar means and another end connected to the boom tube so as to horizontally support the boom tube.

7. An adjustable exhauster arm assembly for conducting gaseous fumes from a work area, the exhauster arm assembly operably connected to a vacuum source and mounted to a supporting surface, the exhauster arm assembly comprising:
  a first arm assembly comprising:
    a hood member;
    a base collar;
    a plurality of rigid tubular members disposed between the base collar and the hood member;
    a plurality of flexible tubular members interconnecting the base collar, the rigid tubular members and the hood member in an alternating relationship such that fluid communication is provided between the base collar and the hood member;
    joint means for pivotally supporting the hood member and the rigid tubular members in a selected position; and
    actuator means for selectively moving and supporting the rigid tubular members; and
  support means for rotatably interconnecting the base collar and the supporting surface, the support means comprising:
    a first support bracket mounted to the supporting surface;
    boom arm means for rotatably interconnecting the first arm assembly and the first support bracket and for radially extending the reach of the first arm assembly, the boom arm means comprising:
      a boom tube having a first end and a second end, the base collar of the first arm assembly rotatably connected to the second end of the boom tube; and
      collar means connected to the first end of the boom tube for rotatably interconnecting the boom tube and the first support bracket; and
    a second support bracket mounted to the supporting surface in a spatial relationship to the first support bracket, and wherein the collar means is rotatably connected to the second support bracket.

8. The exhauster arm assembly of claim 7 further comprising:
  a second arm assembly having a first end and a second end, the first end of the second arm assembly rotatably connected to the second support bracket.

9. The exhauster arm assembly of claim 7 further comprising:
  a second arm assembly, comprising:
    a hood member;
    a base collar rotatably connected to the second support bracket;
    a plurality of rigid tubular members disposed between the base collar and the hood member;
    a plurality of flexible tubular members interconnecting the base collar, the rigid tubular members and the hood member in an alternating relationship such that fluid communication is provided between the base collar and the hood member;
    joint means for pivotally supporting the hood member and the rigid tubular members in a selected position; and actuator means for selectively moving and supporting the rigid tubular members.

10. The exhauster arm assembly of claim 9 further comprising switching means, supported by the hood member of each of the first and second arm assemblies and electrically connected to the actuator means of each of the first and second arm assemblies, for selectively operating such actuator means.

11. The exhauster arm assembly of claim 10 wherein an electric cable connects the switching means of each of the first and second arm assemblies to the actuator means of each of the first and second arm assemblies, respectively, and wherein the exhauster arm assembly further comprises spring means connected to each of the electric cables for maintaining the electric cables in a substantially taut condition as the hood member and the tubular members of each of the first and second arm assemblies are pivotally moved to varied positions.

12. The exhauster arm assembly of claim 11 further comprising:
channel means for receiving and shielding the electric cables as the electric cables slidably move with movement of the hood member and the tubular members of each of the first and second arm assemblies.

13. The exhauster arm assembly of claim 9 wherein the joint means of each of the first and second arm assemblies comprises a first joint comprising a pair of brackets secured to adjacent rigid tubular members of each of the first and second arm assemblies in a parallel relationship, each bracket comprising:
a pair of support arms; and
connecting means for pivotally connecting the support arms.

14. The exhauster arm assembly of claim 13 wherein the joint means of each of the first and second arm assemblies further comprises a second joint comprising a pair of brackets secured to adjacent rigid tubular members of each of the first and second arm assemblies in a parallel relationship, each bracket comprising:
a pair of support arms; and
connecting means for pivotally connecting the support arms.

15. The exhauster arm of claim 14 wherein the second joint of each of the first and second arm assemblies further comprises a friction pad interposed between the support arms thereof, and wherein the connecting means of the second joint includes a finger adjustable nut and bolt combination.

16. The exhauster arm of claim 14 wherein the second joint of each of the first and second arm assemblies further comprises bias means attached to adjacent rigid tubular members of each of the first and second arm assemblies for partially supporting one of the adjacent rigid tubular members of each of the first and second arm assemblies and for effecting spring assisted movement thereto.

17. The exhauster arm of claim 14 wherein the joint means of each of the first and second arm assemblies further comprises a third joint comprising:
a first connecting rod having a first end rigidly connected to an adjacent rigid tubular member of each of the first and second arm assemblies and having a second end rigidly connected to a first pair of linking brackets;
a second connecting rod having a first end rigidly connected to the hood member of each of the first and second arm assemblies and having a second end rigidly connected to a second pair of linking brackets such that the second pair of linking brackets are in a perpendicular relationship to the first pair of linking brackets; and
a third connecting rod having a first end pivotally connected to the first pair of linking brackets and having a second end pivotally connected to the second pair of linking brackets so as to provide universal joint movement to the hood member of each of the first and second arm assemblies.

18. The exhauster arm assembly of claim 12 further comprising a lamp electrically connected to the switching means of each of the first and second arm assemblies and supported by the hood member of each of the first and second arm assemblies for illuminating a plurality of work areas.

19. An adjustable exhauster arm assembly for conducting gaseous fumes from a work area, the exhauster arm assembly operably connected to a vacuum source and mounted to a supporting surface, the exhauster arm assembly comprising:
a first arm assembly comprising:
a hood member;
a base collar;
a plurality of rigid tubular members disposed between the base collar and the hood member;
a plurality of flexible tubular members interconnecting the base collar, the rigid tubular members and the hood member in an alternating relationship such that fluid communication is provided between the base collar and the hood member;
joint means for pivotally supporting the hood member and the rigid tubular members in a selected position; and
actuator means for selectively moving and supporting the rigid tubular members;
support means for rotatably interconnecting the base collar and the supporting surface, the support means comprising:
a first support bracket mounted to the supporting surface; and
boom arm means for rotatably interconnecting the first arm assembly and the first support bracket and for radially extending the reach of the first arm assembly, the boom arm means comprising:
a boom tube having a first end and a second end, the base collar of the first arm assembly rotatably connected to the second end of the boom tube; and
collar means connected to the first end of the boom tube for rotatably interconnecting the boom tube and the first support bracket;
switching means, supported by the hood member and electrically connected to the actuator means by an electric cable, for selectively operating the actuator means; and
spring means connected to the electric cable for maintaining the electric cable in a substantially taut condition as the hood member and the tubular members are pivotally moved to varied positions.

20. The exhauster arm assembly of claim 19 further comprising channel means for receiving and shielding the electric cable as the electric cable slidably moves with movement of the hood member and the tubular members.

21. The exhauster arm assembly of claim 19 wherein the joint means further comprises a second joint comprising a pair of brackets secured to adjacent rigid tubular members in a parallel relationship, each bracket comprising:
  a pair of support arms; and
  connecting means for pivotally connecting the support arms.

22. The exhauster arm of claim 21 wherein the second joint further comprises a friction pad interposed between the support arms thereof, and wherein the connecting means of the second joint includes a finger adjustable nut and bolt combination.

23. The exhauster arm of claim 21 wherein the second joint further comprises bias means attached to adjacent rigid tubular members for partially supporting one of the adjacent rigid tubular members and for effecting spring assisted movement thereto.

24. The exhauster arm assembly of claim 23 wherein the bias means comprises:
  at least one spring extended between the adjacent rigid tubular members such that the spring has unrestricted pivotation with the adjacent rigid tubular members as same are pivoted relative to one another and such that the maximum extension of the spring occurs as the longitudinal axis of the spring intersects the axis of pivotation of the second joint.

25. The exhauster arm of claim 21 wherein the joint means further comprises a third joint comprising:
  a first connecting rod having a first end rigidly connected to an adjacent rigid tubular member and having a second end rigidly connected to a first pair of linking brackets;
  a second connecting rod having a first end rigidly connected to the hood member and having a second end rigidly connected to a second pair of linking brackets such that the second pair of linking brackets are in a perpendicular relationship to the first pair of linking brackets; and
  a third connecting rod having a first end pivotally connected to the first pair of linking brackets and having a second end pivotally connected to the second pair of linking brackets so as to provide universal joint movement to the hood member.

26. The exhauster arm of claim 21 wherein the joint means further comprises a third Joint comprising:
  a first connecting rod having a first end rigidly connected to an adjacent rigid tubular member and having a second end rigidly connected to a pair of linking brackets; and
  a second connecting rod having a first end rotatably journaled to the hood member and having a second end pivotally connected to the linking brackets of the first connecting rod.

27. The exhauster arm assembly of claim 20 further comprising a lamp electrically connected to the switching means and supported by the hood member for illuminating the work area.

28. An adjustable exhauster arm assembly for conducting gaseous fumes from a work area, the exhauster arm assembly operably connected to a vacuum source and mounted to a supporting surface, the exhauster arm assembly comprising:
  a first arm assembly comprising:
    a hood member;
    a base collar;
    a plurality of rigid tubular members disposed between the base collar and the hood member;
    a plurality of flexible tubular members interconnecting the base collar, the rigid tubular members and the hood member in an alternating relationship such that fluid communication is provided between the base collar and the hood member;
    joint means for pivotally supporting the hood member and the rigid tubular members in a selected position; and
    actuator means for selectively moving and supporting the rigid tubular members;
  support means for rotatably interconnecting the base collar and the supporting surface, the support means comprising:
    a first support bracket mounted to the supporting surface; and
    boom arm means for rotatably interconnecting the first arm assembly and the first support bracket and for radially extending the reach of the first arm assembly, the boom arm means comprising:
      a boom tube having a first end and a second end, the base collar of the first arm assembly rotatably connected to the second end of the boom tube;
      collar means connected to the first end of the boom tube for rotatably interconnecting the boom tube and the first support bracket; and
      a support rod having one end connected to the collar means and another end connected to the boom tube so as to horizontally support the boom tube.

29. An adjustable exhauster arm assembly for conducting gaseous fumes from a work area, the exhauster arm assembly operably connected to a vacuum source and mounted to a supporting surface, the exhauster arm assembly comprising:
  a first arm assembly, comprising:
    a hood member;
    a base member;
    a plurality of rigid tubular members disposed between the base collar and the hood member;
    a plurality of flexible tubular members interconnecting the base collar, the rigid tubular members and the hood member in an alternating relationship such that fluid communication is provided between the base collar and the hood member;
    joint means for pivotally supporting the hood member and the rigid tubular members in a selected position; and
    actuator means for selectively moving and supporting the rigid tubular members;
  support means for rotatably interconnecting the base collar and the supporting surface, the support means comprising:
    a first support bracket mounted to the supporting surface;
    boom arm means for rotatably interconnecting the first arm assembly and the first support bracket and for radially extending the reach of the first arm assembly, the boom arm means comprising:
      a boom tube having a first end and a second end, the base collar of the first arm assembly rotatably connected to the second end of the boom tube; and collar means connected to the first end of the boom tube for rotatably interconnecting the boom tube and the first support bracket; and a second support bracket mounted to the supporting surface in a spatial relationship to the first support bracket, and wherein the collar means is rotatably connected to the second support bracket; and a second arm assembly having a first end and a second end, the first end of the second arm assembly rotatably connected to the second support bracket.

30. An adjustable exhauster arm assembly for conducting gaseous fumes from a work area, the exhauster arm assembly operably connected to a vacuum source and mounted to a supporting surface, the exhauster arm assembly comprising:

a first arm assembly comprising:
  a hood member;
  a base collar;
  a plurality of rigid tubular members disposed between the base collar and the hood member;
  a plurality of flexible tubular members interconnecting the base collar, the rigid tubular members and the hood member in an alternating relationship such that fluid communication is provided between the base collar and the hood member;
  joint means for pivotally supporting the hood member and the rigid tubular members in a selected position; and
  actuator means for selectively moving and supporting the rigid tubular members;

support means for rotatably interconnecting the base collar and the supporting surface, the support means comprising:
  a first support bracket mounted to the supporting surface;
  boom arm means for rotatably interconnecting the first arm assembly and the first support bracket and for radially extending the reach of the first arm assembly, the boom arm means comprising:
    a boom tube having a first end and a second end, the base collar of the first arm assembly rotatably connected to the second end of the boom tube; and
    collar means connected to the first end of the boom tube for rotatably interconnecting the boom tube and the first support bracket; and
  a second support bracket mounted to the supporting surface in a spatial relationship to the first support bracket, and wherein the collar means is rotatably connected to the second support bracket; and a second arm assembly comprising:
  a hood member;
  a base collar rotatably connected to the second support bracket;
  a plurality of rigid tubular members disposed between the base collar and the hood member;
  a plurality of flexible tubular members interconnecting the base collar, the rigid tubular members and the hood member in an alternating relationship such that fluid communication is provided between the base collar and the hood member;
  joint means for pivotally supporting the hood member and the rigid tubular members in a selected position; and
  actuator means for selectively moving and supporting the rigid tubular members.

31. The exhauster arm assembly of claim 30 further comprising switching means, supported by the hood member of each of the first and second arm assemblies and electrically connected to the actuator means of each of the first and second arm assemblies, for selectively operating the actuator means.

32. The exhauster arm assembly of claim 31 wherein an electric cable connects the switching means of each of the first and second arm assemblies to the actuator means of each of the first and second arm assemblies, respectively, and wherein the exhauster arm assembly further comprises spring means connected to each of the electric cables for maintaining the electric cables in a substantially taut condition as the hood member and the tubular members of each of the first and second arm assemblies are pivotally moved to varied positions.

33. The exhauster arm assembly of claim 32 further comprising channel means for receiving and shielding the electric cables as the electric cables slidably move with movement of the hood member and the tubular members of each of the first and second arm assemblies.

34. The exhauster arm assembly of claim 30 wherein the joint means of each of the first and second arm assemblies comprises a first joint comprising a pair of brackets secured to adjacent rigid tubular members of each of the first and second arm assemblies in a parallel relationship, each bracket comprising:
  a pair of support arms; and
  connecting means for pivotally connecting the support arms.

35. The exhauster arm assembly of claim 34 wherein the joint means of each of the first and second arm assemblies further comprises a second joint comprising a pair of brackets secured to adjacent rigid tubular members of each of the first and second arm assemblies in a parallel relationship, each bracket comprising:
  a pair of support arms; and
  connecting means for pivotally connecting the support arms.

36. The exhauster arm of claim 35 wherein the second joint of each of the first and second joint assemblies further comprises a friction pad interposed between the support arms thereof, and wherein the connecting means of the second joint includes a finger adjustable nut and bolt combination.

37. The exhauster arm of claim 35 wherein the second joint of each of the first and second arm assemblies further comprises bias means attached to adjacent rigid tubular members of each of the first and second arm assemblies for partially supporting one of the adjacent rigid tubular members of each of the first and second arm assemblies and for effecting spring assisted movement thereto.

38. The exhauster arm of claim 35 wherein the joint means of each of the first and second arm assemblies comprises a third joint comprising:
  a first connecting rod having a first end rigidly connected to an adjacent rigid tubular member of each of the first and second arm assemblies and having a second end rigidly connected to a first pair of linking brackets;
  a second connecting rod having a first end rigidly connected to the hood member of each of the first and second arm assemblies and having a second end rigidly connected to a second pair of linking brackets such that the second pair of linking brackets are in a perpendicular relationship to the first pair of linking brackets; and a third connecting rod having a first end pivotally connected to the first pair of linking brackets and having a second end pivotally connected to the second pair of linking brackets so as to provide universal joint movement to the hood member of each of the first and second arm assemblies.

39. The exhauster arm of claim 35 wherein the joint means of each of the first and second arm assemblies comprises a third joint comprising:

a first connecting rod having a first end rigidly connected to an adjacent rigid tubular member of each of the first and second arm assemblies and having a second end rigidly connected to a pair of linking brackets; and a second connecting rod having a first end rotatably journaled to the hood member of each of the first and second arm assemblies and having a second end pivotally connected to the linking brackets of the first connecting rod.

40. The exhauster arm assembly of claim 33 further comprising a lamp electrically connected to the switching means of each of the first and second arm assemblies and supported by the hood members of each of the first and second arm assemblies for illuminating a plurality of work areas.

41. An adjustable exhauster arm assembly for conducting gaseous fumes from a work area, the exhauster arm assembly operably connected to a vacuum source and mounted to a supporting surface, the exhauster arm assembly comprising:

a hood member;

a base collar;

a plurality of rigid tubular members disposed between the base collar and the hood member;

a plurality of flexible tubular members interconnecting the base collar, the rigid tubular members and the hood member in an alternating relationship such that fluid communication is provided between the base collar and the hood member;

joint means for pivotally supporting the hood member and the rigid tubular members in a selected position; and first support means connected between the base collar and the adjacent rigid tubular member for supporting the rigid tubular members;

switching means, supported by the hood member and electrically connected to the vacuum source, for selectively operating the vacuum source;

spring means connected to the electric cable for maintaining the electric cable in a substantially taut condition as the hood member and the rigid tubular members are pivotally moved to varied positions; and second support means for rotatably interconnecting the base collar and the supporting surface.

42. An adjustable exhauster arm assembly for conducting gaseous fumes from a work area, the exhauster arm assembly operably connected to a vacuum source and mounted to a supporting surface, the exhauster arm assembly comprising:

a hood member;

a base collar;

a plurality of rigid tubular members disposed between the base collar and the hood member;

a plurality of flexible tubular members interconnecting the base collar, the rigid tubular members and the hood member in an alternating relationship such that fluid communication is provided between the base collar and the hood member;

joint means for pivotally supporting the hood member and the rigid tubular members in a selected position, the joint means comprising:

a pair of brackets secured to adjacent rigid tubular members, each bracket including a pair of support arms pivotally coupled together with a finger adjustable nut and bolt combination;

a friction pad interposed between the support arms; and bias means attached to the adjacent rigid tubular members for partially supporting one of the adjacent rigid tubular members and for effecting spring assisted movement thereto, the bias means comprising:

at least one spring extended between the adjacent rigid tubular members at the lower end of one tubular member and the upper end of the other tubular member such that the spring has unrestricted pivotation with the adjacent rigid tubular members as same are pivoted relative to one another and such that the maximum extension of the spring occurs as the longitudinal axis of the spring intersects the axis of pivotation of the joint means;

first support means connected between the base collar and the adjacent rigid tubular member for supporting the rigid tubular members; and second support means for rotatably interconnecting the base collar and the supporting surface.

43. An adjacent exhauster arm assembly for conducting gaseous fumes from a work area, the exhauster arm assembly operably connected to a vacuum source and mounted to a supporting surface, the exhauster arm assembly comprising:

first and second arm assemblies, each comprising:

a hood member;

a base collar;

a plurality of rigid tubular members disposed between the base collar and the hood member;

a plurality of flexible tubular members interconnecting the base collar, the rigid tubular members and the hood member in an alternating relationship such that fluid communication is provided between the base collar and the hood member; and joint means for pivotally supporting the hood member and the rigid tubular members in a selected position; and support means for rotatably interconnecting the base collar of the first and second arm assemblies and the supporting surface, the support means comprising:

a first support bracket mounted to the supporting surface;

a second support bracket mounted to the supporting surface in a spatial relationship to the first support bracket and having the base collar of the second arm assembly rotatably connected thereto; and boom arm means for rotatably interconnecting the first arm assembly and the first support bracket, for radially extending the reach of the first arm assembly and for interconnecting the second support bracket and the first support bracket, the boom arm means comprising:

a boom tube having a first end and a second end, the base collar of the first arm assembly rotatably connected to the second end of the boom tube; and collar means for rotatably interconnecting the boom tube, the first support bracket and the second support bracket.

44. An adjustable exhauster arm assembly for conducting gaseous fumes from a work area, the exhauster arm assembly operably connected to a vacuum source and mounted to a supporting surface, the exhauster arm assembly comprising:

a first arm assembly comprising:

a hood member;

a base collar;

a plurality of rigid tubular members disposed between the base collar and the hood member;

a plurality of flexible tubular members interconnecting the base collar, the rigid tubular members and the hood member in an alternating relationship such that fluid communication is provided between the base collar and the hood member;

joint means for pivotally supporting the hood member and the rigid tubular members in a selected position, the joint means comprising:

a first joint comprising a pair of brackets secured to adjacent rigid tubular members in a parallel relationship, each bracket comprising:

a pair of support arms; and connecting means for pivotally connecting the support arms; and a second joint comprising a pair of brackets secured to adjacent rigid tubular members in a parallel relationship, each bracket comprising:

a pair of support arms;

connecting means for pivotally connecting the support arms; and bias means attached to adjacent tubular members at the lower end of one tubular member and the upper end of the other tubular member for partially supporting one of the adjacent rigid tubular members and for effecting spring assisted movement thereto, the bias means comprising at least one spring extended between the adjacent rigid tubular members such that the spring has unrestricted pivotation with the adjacent rigid tubular members as same are provided relative to one another and such that the maximum extension of the spring occurs as the longitudinal axis of the spring intersects the axis of pivotation of the second joint; and actuator means for selectively moving and supporting the rigid tubular members; and support means for rotatably interconnecting the base collar and the supporting surface.

* * * * *

UNITED STATES PATENT AND TRADEMARK OFFICE
CERTIFICATE OF CORRECTION

PATENT NO. : 5,336,130
DATED : August 9, 1994
INVENTOR(S) : Shaun Ray

It is certified that error appears in the above-indentified patent and that said Letters Patent is hereby corrected as shown below:

Column 12, line 2, before "mounted" insert --and--;

Column 12, line 20, delete "member" and substitute therefor --members--;

Column 12, line 25, after "brackets" insert --secured--;

Column 12, line 56, before "mounted" insert --and--;

Column 13, line 4, after "brackets" insert --secured--;

Column 13, line 10, after "brackets" insert --secured--;

Column 22, line 37, delete "adjacent" and substitute therefor --adjustable--; and Column 24, line 23, delete "provided" and substitute therefor --pivoted--.

Signed and Sealed this

Fifteenth Day of November, 1994

Attest:

BRUCE LEHMAN

Attesting Officer *Commissioner of Patents and Trademarks*